US012700939B2

(12) United States Patent
Chou et al.

(10) Patent No.: US 12,700,939 B2
(45) Date of Patent: Aug. 4, 2026

(54) METHOD OF CLOCK SYNCHRONIZATION BETWEEN TRANSMITTER AND RECEIVER

(71) Applicant: MEDIATEK INC., Hsin-Chu (TW)

(72) Inventors: Yu-Shen Chou, Hsinchu City (TW);
Ko-Yin Lai, Hsinchu City (TW);
Chih-Kang Hsu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 297 days.

(21) Appl. No.: 18/398,163

(22) Filed: Dec. 28, 2023

(65) Prior Publication Data

US 2025/0219752 A1     Jul. 3, 2025

(51) Int. Cl.
*H04J 3/06* (2006.01)
*H04W 56/00* (2009.01)

(52) U.S. Cl.
CPC .......... *H04J 3/0667* (2013.01); *H04J 3/0617* (2013.01); *H04W 56/0015* (2013.01)

(58) Field of Classification Search
CPC ...... H04J 3/0667; H04J 3/0617; H04J 3/0661; H04W 56/0015; H04W 56/001
See application file for complete search history.

(56) References Cited

U.S. PATENT DOCUMENTS

| 2013/0301635 | A1* | 11/2013 | Hollabaugh | ...... H04W 56/0035 370/350 |
| 2018/0004244 | A1* | 1/2018 | Woodhead | ......... H04N 21/4307 |
| 2019/0089472 | A1* | 3/2019 | Zhang | ................ H04N 21/8547 |
| 2021/0104211 | A1* | 4/2021 | John | ........................ G06F 3/011 |
| 2021/0160803 | A1* | 5/2021 | Bilstad | .................. H04L 7/0012 |

FOREIGN PATENT DOCUMENTS

| CN | 110324889 | A | 10/2019 | |
| EP | 3675444 | A1* | 7/2020 | ......... H04L 27/2602 |
| WO | WO-2023057441 | A1* | 4/2023 | .......... H04W 56/001 |

* cited by examiner

*Primary Examiner* — Cheikh T Ndiaye
(74) *Attorney, Agent, or Firm* — Winston Hsu

(57) ABSTRACT

A method of clock synchronization between a transmitter and a receiver includes sampling a first receiver timestamp and a second receiver timestamp of the receiver at a first time and a second time respectively, sampling a first transmitter timestamp and a second transmitter timestamp of the transmitter at a third time and a fourth time respectively, sampling a first timing synchronization function (TSF) receiver timestamp and a second TSF receiver timestamp by a Wi-Fi TSF at the first time and the second time respectively, sampling a first TSF transmitter timestamp and a second TSF transmitter timestamp by the Wi-Fi TSF at the third time and the fourth time respectively, generating an initial timestamp, generating an initial TSF timestamp, generating a target phase difference, and performing a coarse tune at a receiver system clock periodically to compensate the target phase difference.

13 Claims, 3 Drawing Sheets

METHOD OF CLOCK SYNCHRONIZATION BETWEEN TRANSMITTER AND RECEIVER

BACKGROUND

High Definition Multimedia Interface (HDMI) is a fully digital image and sound transmission interface that can transmit uncompressed audio and video signals. HDMI can be used in boxes, DVD players, personal computers, video game consoles, integrated amplifiers, digital audio and televisions and other devices. HDMI can transmit audio and video signals simultaneously. The design of using the same cable for audio and video signals greatly simplifies the installation of system lines. However, HDMI technique still requires a physical cable connected between the box and the television.

In the past, Wi-Fi networks already supported dual-band and tri-band operations, but devices were forced to select specific frequency bands. The devices can only choose between 2.4 GHz and 5 GHz bands of Wi-Fi networks, using a single connection to transmit or receive data.

Wi-Fi 7 allows Wi-Fi 7 devices to send and receive data simultaneously across multiple frequency bands and channels through multi-link operation (MLO). Therefore, the throughput is increased and the latency is reduced, thus improving reliability for emerging applications such as visual reality (VR)/augmented reality (AR), online gaming, remote office, and cloud computing.

With the throughput improvement in Wi-Fi 7, high quality audio and video signals can be transmitted and received through Wi-Fi. Therefore, a wireless product such as a dongle transmitter and a dongle receiver can replace the HDMI cable between the television and the box, resulting in a wireless one connected line (WOCL) solution.

However, a wireless Wi-Fi link between the dongle transmitter coupled to the box and the dongle receiver coupled to the television suffers from the unsynchronized system clocks. If a system clock frequency of the dongle transmitter is larger than a system clock frequency of the dongle receiver, then the buffer will overflow. If a system clock frequency of the dongle transmitter is smaller than a system clock frequency of the dongle receiver, then the buffer will underflow.

SUMMARY

A method of clock synchronization between a transmitter and a receiver includes sampling a first receiver timestamp and a second receiver timestamp of the receiver at a first time and a second time respectively, sampling a first transmitter timestamp and a second transmitter timestamp of the transmitter at a third time and a fourth time respectively, sampling a first timing synchronization function (TSF) receiver timestamp and a second TSF receiver timestamp by a Wi-Fi TSF at the first time and the second time respectively, sampling a first TSF transmitter timestamp and a second TSF transmitter timestamp by the Wi-Fi TSF at the third time and the fourth time respectively, generating an initial timestamp according to the first receiver timestamp and the first transmitter timestamp, generating an initial TSF timestamp according to the first TSF receiver timestamp and the first TSF transmitter timestamp, generating a target phase difference according to the initial timestamp, the initial TSF timestamp, the first receiver timestamp, the second receiver timestamp, the first TSF receiver timestamp, the second TSF receiver timestamp, the second TSF transmitter timestamp, and the second transmitter timestamp, and performing a coarse tune at a receiver system clock periodically to compensate the target phase difference.

A method of clock synchronization between a transmitter and a receiver via a wireless communication protocol includes sampling at least two transmitting timestamps at the transmitter periodically in a reference time domain of the wireless communication protocol, the at least two transmitting timestamps being sampled at different time points and separated by a predetermined interval one after another, sampling at least two receiving timestamps at the receiver in the reference time domain of the wireless communication protocol, and adjusting a system clock frequency at the receiver according to an offset derived from the at least two transmitting timestamps, at least two receiving timestamps and the predetermined interval.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
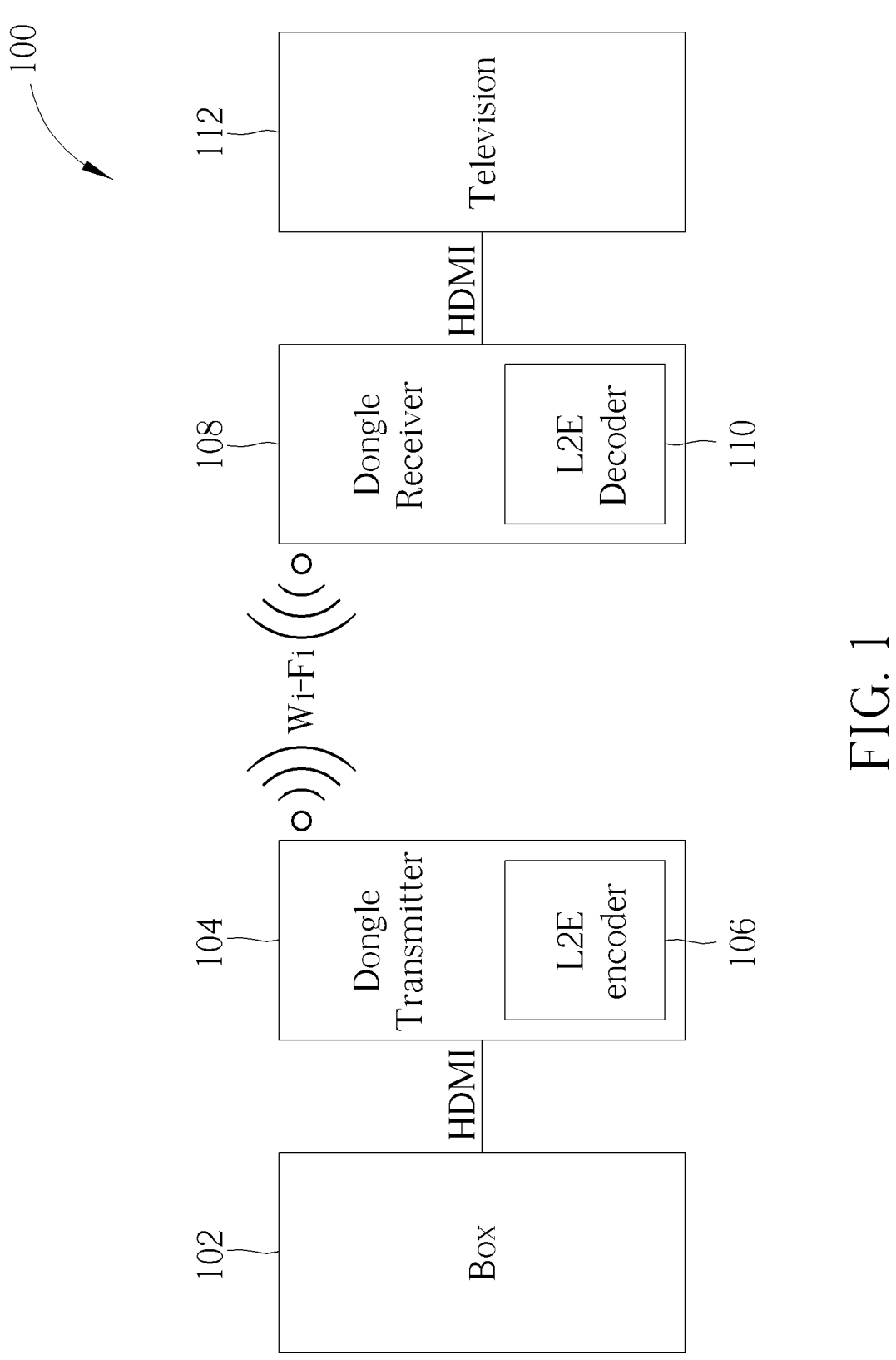
FIG. 1 is a block diagram of a wireless one connected line system according to an embodiment of the present invention.

FIG. 1 is a block diagram of a wireless one connected line (WOCL) system 100 according to an embodiment of the present invention. The WOCL system 100 comprises a box 102, a dongle transmitter 104 coupled to the box through High Definition Multimedia Interface (HDMI), a dongle receiver 108 linked to the dongle transmitter 104 through Wi-Fi, and a television 112 coupled to the dongle receiver 108 through HDMI. The dongle transmitter 104 comprises a video encoder 106, and the dongle receiver 108 comprises a line to evolution (L2E) decoder 110.

Wireless one connected line (WOCL) enables wireless transmission between the box 102 and television 112 via Wi-Fi. The box side is equipped with the dongle transmitter 104, while the television side features the dongle receiver 108. The box 102 converts all signals into a High Definition Multimedia Interface (HDMI) output and sends the HDMI output to the dongle transmitter 104. The dongle transmitter 104 compresses the HDMI output with the L2E encoder 106 to generate Wi-Fi packets. The Wi-Fi packets are transmitted to the dongle receiver 108 wirelessly from the dongle transmitter 104. The dongle receiver 108 receives the Wi-Fi packets and decodes the Wi-Fi packets with the L2E decoder 110 into an HDMI input, and the HDMI input is outputted to the television 112. This entire process can be regarded as transmitting signals from the box 102 to the television 112 through an HDMI transmission line. In a wired environment, the system clock remains synchronous, but in a wireless environment, the transmitter system clock and the receiver system clock in the dongle transmitter 104 and the dongle receiver 108 respectively may experience clock drift, thus additional synchronization has to be performed to prevent video frames from being dropped or being repeatedly transmitted.

Figure 2:
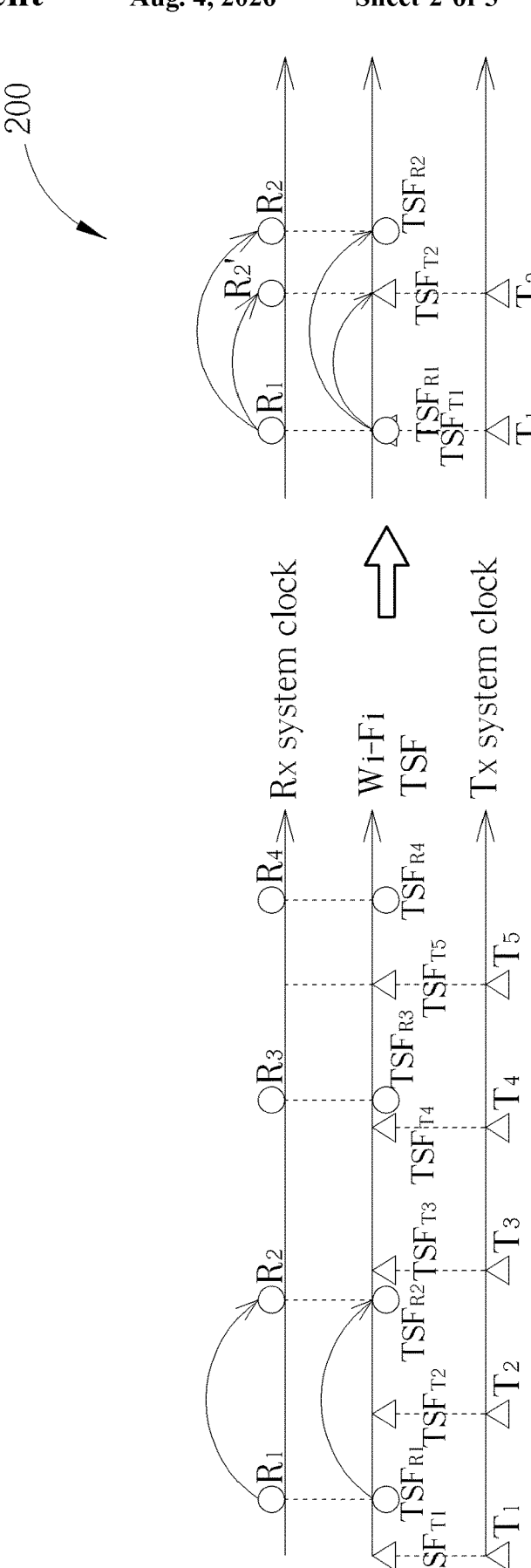
FIG. 2 is a method for system clock synchronization using Wi-Fi timing synchronization function according to an embodiment of the present invention.

FIG. 2 is a method 200 for clock synchronization using Wi-Fi timing synchronization function according to an embodiment of the present invention. In this embodiment, the transmitter and the receiver is communicated via Wi-Fi communication protocol. According to FIG. 2, a first receiver timestamp $R_1$ and a second receiver timestamp $R_2$ are sampled by the receiver system clock at a first time and a second time respectively. Moreover, a first transmitter timestamp $T_1$ and a second transmitter timestamp $T_2$ are sampled by the transmitter system clock at a third time and a fourth time respectively. In addition, the Wi-Fi communication protocol provides timing synchronization function (TSF) to act as a reference clock. A first timing synchronization function (TSF) receiver timestamp $TSF_{R1}$, a second TSF receiver timestamp $TSF_{R2}$, a first TSF transmitter timestamp $TSF_{T1}$ and a second TSF transmitter timestamp $TSF_{T2}$ are sampled by a Wi-Fi TSF at the first time, the second time, the third time and the fourth time respectively.

In an embodiment, the time period between the first time and the second time is about 200 milliseconds, and the time period between the third time and the fourth time is also about 200 milliseconds.

At first, an initial timestamp $T_{INI}$ is generated according to the first receiver timestamp $R_1$ and the first transmitter timestamp $T_1$ by using a following equation:

$$T_{INI} = R_1 - T_1$$

Secondly, an initial TSF timestamp $TSF_{INI}$ is generated according to the first TSF receiver timestamp $TSF_{R1}$ and the first TSF transmitter timestamp $TSF_{T1}$ by using a following equation:

$$TSF_{INI} = TSF_{R1} - TSF_{T1}$$

As illustrated in FIG. 2, $R_2'$ is denoted as a synchronized second receiver timestamp $R_2'$. The ideal situation is to adjust the second receiver timestamp from $R_2$ to $R_2'$ so that the system clocks of the transmitter and receiver may be synchronized. Third, the synchronized second receiver timestamp $R_2'$ is generated according to the following equation:

$$R_2' = (R_1 - T_{INI}) + (R_2 - R_1) * \frac{TSF_{T2} - (TSF_{R1} - TSF_{INI})}{TSF_{R2} - TSF_{R1}}$$

In this equation, the timeline of the receiver system clock is aligned with the timeline of the transmitter system clock. The difference between the second receiver timestamp $R_2$ and the first receiver timestamp $R_1$ is transferred to be on the timeline of the transmitter system clock. Therefore, the synchronized second receiver timestamp $R_2'$ is transferred from the second receiver timestamp $R_2$ at the timeline of the transmitter system clock.

The target phase difference between the second transmitter timestamp $T_2$ and the synchronized second receiver timestamp $R_2'$ can be thus calculated by the following equation:

Target Phase Difference =
$$(R_1 - T_{INI}) + (R_2 - R_1) * \frac{TSF_{T2} - (TSF_{R1} - TSF_{INI})}{TSF_{R2} - TSF_{R1}} - T_2$$

By subtracting $T_2$ from $R_2'$, the target phase difference can be calculated, thus an offset is derived according to the following equation, and a coarse tune is performed accordingly to the receiver system clock.

$$\text{Coarse tune} = \frac{\text{Target Phase Difference}}{(TSF_{T2} - TSF_{T1}) * Tf} \times TSFf$$

Tf is a frequency of a system clock, and TSFf is a frequency of a TSF clock. In an embodiment, Tf can be about 10 MHz, and TSFf can be about 1 MHz. At last, a coarse tune is performed at the receiver system clock periodically to compensate the target phase difference.

In another embodiment, a fine tune is performed in addition to the coarse tune. At the fine tune stage, an ith receiver timestamp $R_i$ and an (i−1)th receiver timestamp $R_{i-1}$ are sampled by a receiver system clock at an ith time and an (i−1)th time respectively. An ith transmitter timestamp $T_i$ and an (i−1)th transmitter timestamp $T_{i-1}$ are sampled by a transmitter system clock at a jth time and a (j−1)th time respectively. An ith TSF receiver timestamp $TSF_{R_i}$ and an (i−1)th TSF receiver timestamp $TSF_{R_{i-1}}$ are sampled by the Wi-Fi TSF at the ith time and the (i−1)th time respectively. An ith TSF transmitter timestamp $TSF_{T_i}$ and an (i−1)th TSF transmitter timestamp $TSF_{T_{i-1}}$ are sampled by the Wi-Fi TSF at the jth time and the (j−1)th time respectively, where i and j are integers larger than 2.

Then, the phase difference can be calculated as the following equation:

$$\text{Phase } Diff = (R_{i-1} - T_{INI}) + (R_i - R_{i-1}) * \frac{TSF_{T_i} - (TSF_{R_{i-1}} - TSF_{INI})}{TSF_{R_i} - TSF_{R_{i-1}}} - T_i$$

An ith first difference $fd_i$ is generated according to the target phase difference and the phase difference by using the following equation:

$$fd_i = \text{target phase difference} - \text{phase difference}$$

Therefore, the ith first difference $fd_i$ is inputted into a loop filter for generating a fine tune. In an embodiment, the fine tune can be performed according to the following equation by using an average loop filter:

$$\text{fine tune} = \sum_{i=j}^{j+n-1} \frac{fd_i}{(TSF_{T_i} - TSF_{T_{i-1}}) \times Tf \times n} \times TSFf$$

where n is an integer greater than 0. The loop filter can be but not limited to the average of n.

In another embodiment, the ith transmitter timestamp $T_i$ and the ith TSF transmitter timestamp $TSF_{T_i}$ are discarded when the following condition is satisfied:

$$\left| TSF_{T_i} - TSF_{T_{i-1}} - T_{ob} \right| > \text{threshold}$$

where $T_{ob}$ is a time duration for observing transmitter timestamps such as 200 milliseconds.

Figure 3:
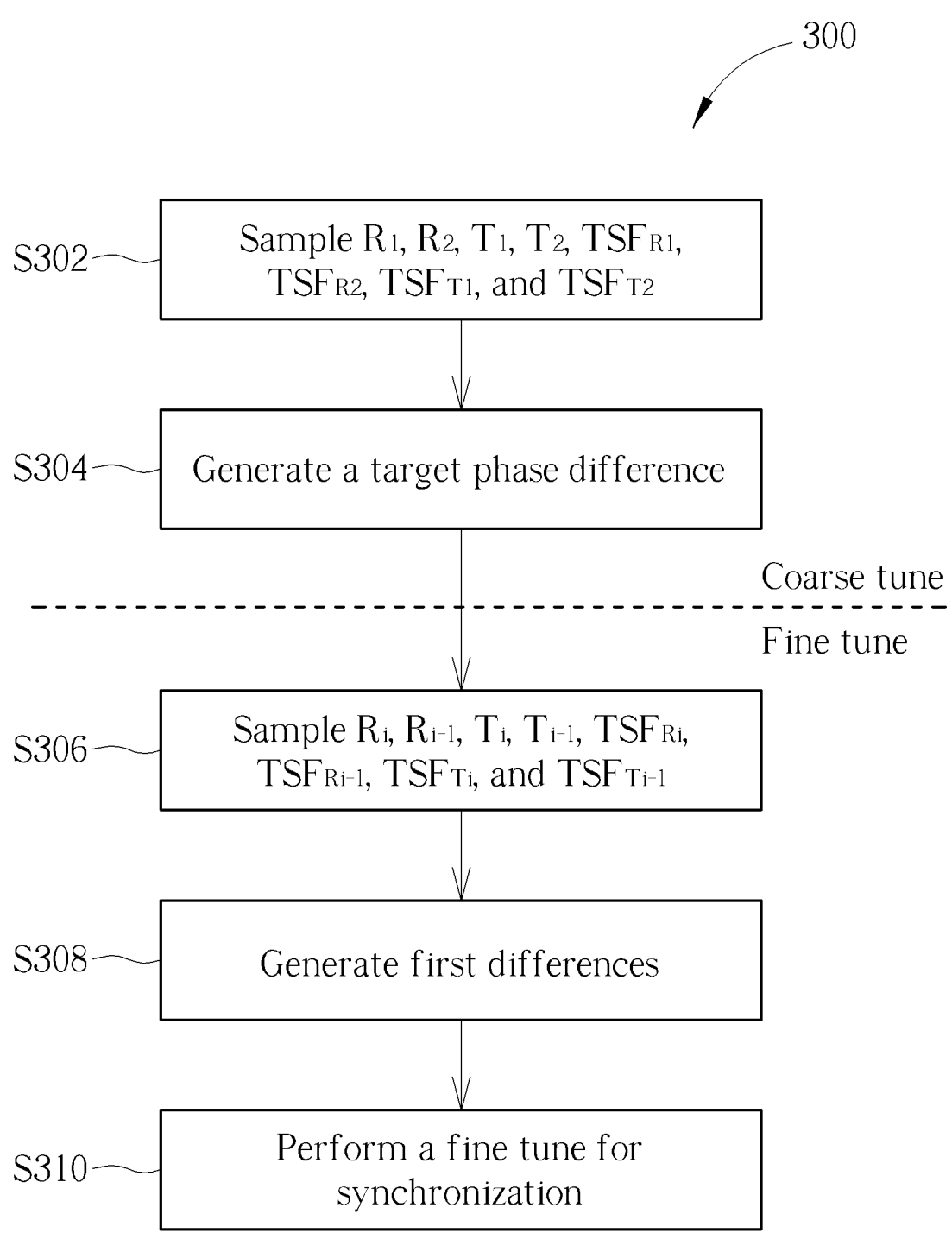
FIG. 3 is a flow chart of a method for system clock synchronization according to an embodiment of the present invention.

FIG. 3 is a flow chart of a method 300 for system clock synchronization according to an embodiment of the present invention. The method 300 includes the following steps:

Step S302: Sample a first receiver timestamp $R_1$, a second receiver timestamp $R_2$, a first transmitter timestamp $T_1$, a second transmitter timestamp $T_2$, a first TSF receiver timestamp $TSF_{R1}$, a second TSF receiver timestamp $TSF_{R2}$, a first TSF transmitter timestamp $TSF_{T1}$, and a second TSF transmitter timestamp $TSF_{T2}$;

Step S304: Generate a target phase difference according to the first receiver timestamp $R_1$, the second receiver timestamp $R_2$, the first transmitter timestamp $T_1$, the second transmitter timestamp $T_2$, the first TSF receiver timestamp $TSF_{R1}$, the second TSF receiver timestamp $TSF_{R2}$, the first TSF transmitter timestamp $TSF_{T1}$, and the second TSF transmitter timestamp $TSF_{T2}$;

Step S306: Sample an ith receiver timestamp $R_i$, an (i−1)th receiver timestamp $R_{i-1}$, an ith transmitter timestamp $T_i$, an (i−1)th transmitter timestamp $T_{i-1}$, an ith TSF receiver timestamp $TSF_{R_i}$, an (i−1)th TSF receiver timestamp $TSF_{R_{i-1}}$, an ith TSF transmitter timestamp $TSF_{T_i}$, and an (i−1)th TSF transmitter timestamp $TSF_{T_{i-1}}$;

Step S308: Generate first differences according to the ith receiver timestamp $R_i$, the (i−1)th receiver timestamp $R_{i-1}$, the ith transmitter timestamp $T_i$, the (i−1)th transmitter timestamp $T_{i-1}$, the ith TSF receiver timestamp $TSF_{R_i}$, the (i−1)th TSF receiver timestamp $TSF_{R_{i-1}}$, the ith TSF transmitter timestamp $TSF_{T_i}$, and the (i−1)th TSF transmitter timestamp $TSF_{T_{i-1}}$; and Step S310: Perform a fine tune for synchronization between the transmitter system clock and the receiver system clock.

Steps S302, S304 are utilized for coarse tune, and steps S306-S310 are utilized for fine tune. By performing the coarse tune and the fine tune, the frequency of the receiver system clock can match the frequency of the transmitter system clock. Therefore, no overflow or underflow would occur in the buffer. The method for system clock synchronization can thus be completed by using Wi-Fi timing synchronization function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of clock synchronization between a transmitter and a receiver, comprising:

sampling a first receiver timestamp and a second receiver timestamp of the receiver at a first time and a second time respectively;

sampling a first transmitter timestamp and a second transmitter timestamp of the transmitter at a third time and a fourth time respectively;

sampling a first timing synchronization function (TSF) receiver timestamp and a second TSF receiver timestamp by a Wi-Fi TSF at the first time and the second time respectively;

sampling a first TSF transmitter timestamp and a second TSF transmitter timestamp by the Wi-Fi TSF at the third time and the fourth time respectively;

generating an initial timestamp according to the first receiver timestamp and the first transmitter timestamp;

generating an initial TSF timestamp according to the first TSF receiver timestamp and the first TSF transmitter timestamp;

generating a target phase difference according to the initial timestamp, the initial TSF timestamp, the first receiver timestamp, the second receiver timestamp, the first TSF receiver timestamp, the second TSF receiver timestamp, the second TSF transmitter timestamp, and the second transmitter timestamp; and performing a coarse tune at a receiver system clock periodically to compensate the target phase difference.

2. The method of claim 1, wherein generating the initial timestamp according to the first receiver timestamp and the first transmitter timestamp is subtracting the first transmitter timestamp from the first receiver timestamp to generate the initial timestamp.

3. The method of claim 1, wherein generating the initial TSF timestamp according to the first TSF receiver timestamp and the first TSF transmitter timestamp is subtracting the first TSF transmitter timestamp from the first TSF receiver timestamp to generate the initial timestamp.

4. The method of claim 1, wherein generating the target phase difference according to the initial timestamp, the initial TSF timestamp, the first receiver timestamp, the second receiver timestamp, the first TSF receiver timestamp, the second TSF receiver timestamp, the second TSF transmitter timestamp, and the second transmitter timestamp is:

Target Phase Difference =

$$(R_1 - T_{INI}) + (R_2 - R_1) * \frac{TSF_{T2} - (TSF_{R1} - TSF_{INI})}{TSF_{R2} - TSF_{R1}} - T_2$$

wherein:

$R_1$ is the first receiver timestamp;

$R_2$ is the second receiver timestamp;

$T_{INI}$ is the initial timestamp;

$TSF_{T2}$ is the second TSF transmitter timestamp;

$TSF_{R1}$ is the first TSF receiver timestamp;

$TSF_{INI}$ is the initial TSF timestamp;

$TSF_{R2}$ is the second TSF receiver timestamp; and $T_2$ is the second transmitter timestamp.

5. The method of claim 4 wherein the coarse tune is performed according to a following equation:

$$\text{Coarse tune} = \frac{\text{Target Phase Difference}}{(TSF_{T2} - TSF_{T1}) * Tf} \times TSFf$$

wherein:

$TSF_{T1}$ is the first TSF transmitter timestamp;

Tf is a frequency of a system clock; and

TSFf is a frequency of a TSF clock.

6. The method of claim 5, wherein the frequency of the system clock is about 10 MHz, and the frequency of the TSF clock is about 1 MHz.

7. The method of claim 4, further comprising:

sampling an ith receiver timestamp and an (i−1)th receiver timestamp by a receiver system clock at an ith time and an (i−1)th time respectively;

sampling an ith transmitter timestamp and an (i−1)th transmitter timestamp by a transmitter system clock at a jth time and a (j−1)th time respectively;

sampling an ith TSF receiver timestamp and an (i−1)th TSF receiver timestamp by the Wi-Fi TSF at the ith time and the (i−1)th time respectively;

sampling an ith TSF transmitter timestamp and an (i−1)th TSF transmitter timestamp by the Wi-Fi TSF at the jth time and the (j−1)th time respectively;

generating a phase difference according to the initial timestamp, the initial TSF timestamp, the ith receiver timestamp, the (i−1)th receiver timestamp, the ith TSF transmitter timestamp, the ith TSF receiver timestamp, the (i−1)th TSF receiver timestamp and the ith transmitter timestamp;

generating first differences between the target phase difference and phase differences;

applying a loop filter to filter the first differences to an average difference; and performing a fine tune at receiver system clock periodically to compensate the average difference;

wherein i and j are integers larger than 2.

8. The method of claim 7, wherein generating the phase difference according to the initial timestamp, the initial TSF timestamp, the ith receiver timestamp, the (i−1)th receiver timestamp, the ith TSF transmitter timestamp, the ith TSF receiver timestamp, the (i−1)th TSF receiver timestamp and the ith transmitter timestamp is:

$$\text{Phase } Diff = (R_{i-1} - T_{INI}) + (R_i - R_{i-1}) * \frac{TSF_{T_i} - \left(TSF_{R_{i-1}} - TSF_{INI}\right)}{TSF_{R_i} - TSF_{R_{i-1}}} - T_i$$

wherein:

$R_{i-1}$ is the (i−1)th receiver timestamp;

$R_i$ is the ith receiver timestamp;

$TSF_{T_i}$ is the ith TSF transmitter timestamp;

$TSF_{R_{i-1}}$ is the (i−1)th TSF receiver timestamp;

$TSF_{R_i}$ is the ith TSF receiver timestamp; and $T_i$ is the ith transmitter timestamp.

9. The method of claim 8, wherein generating the first differences between the target phase difference and the phase differences comprises subtracting the target phase difference from the phase difference to generate a first difference.

10. The method of claim 9, wherein the fine tune is performed according to a following equation:

$$\text{fine tune} = \sum_{i=j}^{j+n-1} \frac{fd_i}{\left(TSF_{T_i} - TSF_{T_{i-1}}\right) \times Tf \times n} \times TSFf$$

wherein:

$fd_i$ is an ith first difference;

$TSF_{T_{i-1}}$ is an (i−1)th TSF transmitter timestamp;

Tf is a frequency of a system clock;

TSFf is a frequency of a TSF clock; and n is an integer greater than 0.

11. The method of claim 10, wherein the frequency of the system clock is about 10 MHz, and the frequency of the TSF clock is about 1 MHz.

12. The method of claim 7, further comprising discarding the ith transmitter timestamp and the ith TSF transmitter timestamp when a following condition is satisfied:

$$\left| TSF_{T_i} - TSF_{T_{i-1}} - T_{ob} \right| > \text{threshold}$$

wherein:

$TSF_{T_i}$ is the ith TSF transmitter timestamp;

$TSF_{T_{i-1}}$ is an (i−1)th TSF transmitter timestamp; and $T_{ob}$ is a time duration for observing transmitter timestamps.

13. The method of claim 1, wherein receiver timestamps and transmitter timestamps are sampled at a frequency of 5 Hz.

* * * * *